Aug. 19, 1958  L. G. TAYLOR  2,848,126
BOAT TRAILER
Filed Aug. 9, 1955  3 Sheets-Sheet 1
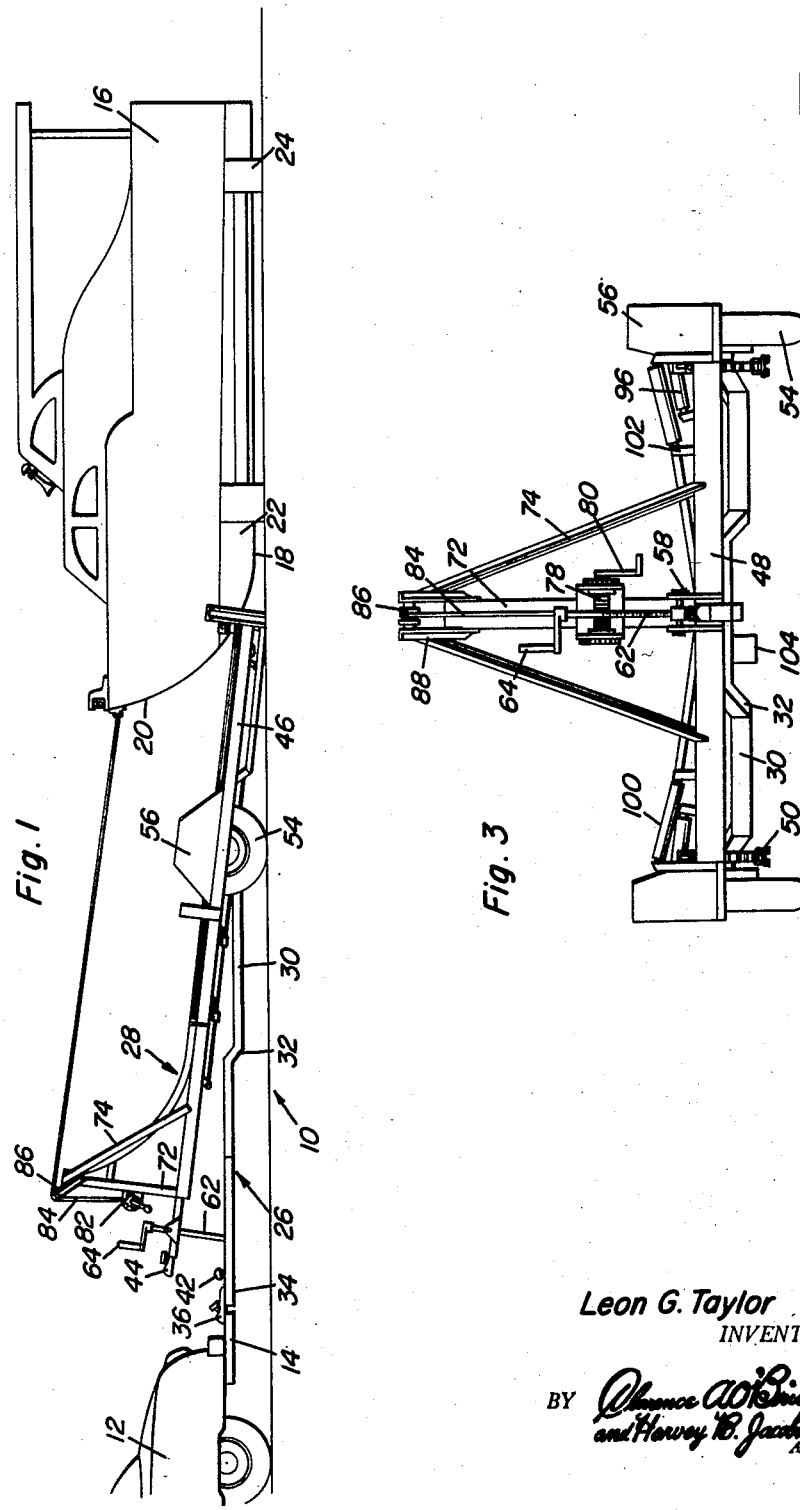
Leon G. Taylor
INVENTOR.

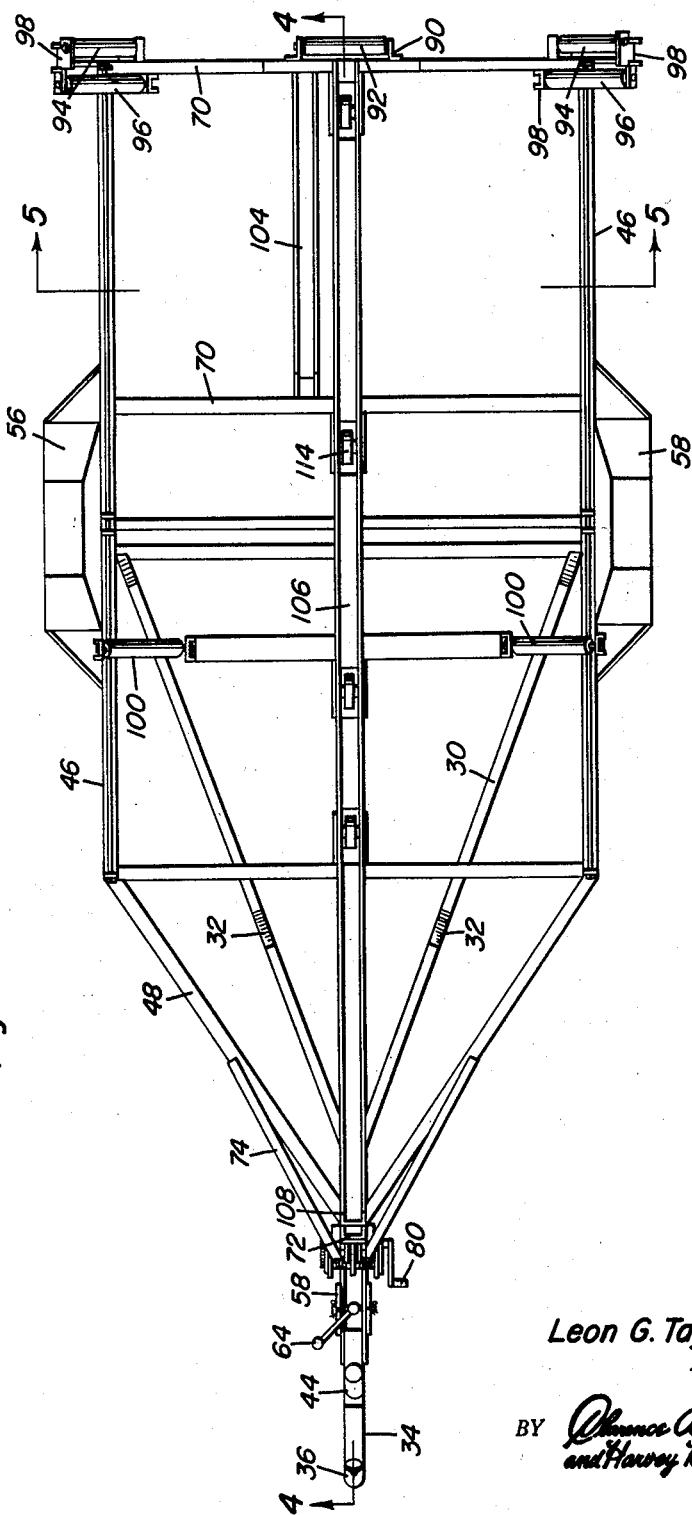

Aug. 19, 1958

L. G. TAYLOR 2,848,126

BOAT TRAILER

Filed Aug. 9, 1955

Leon G. Taylor
INVENTOR.

United States Patent Office

2,848,126
Patented Aug. 19, 1958

2,848,126

BOAT TRAILER

Leon G. Taylor, Tucson, Ariz.

Application August 9, 1955, Serial No. 527,306

4 Claims. (Cl. 214—506)

This invention generally relates to a boat trailer, and more specifically provides improved and novel construction in a boat trailer having improved means for loading and unloading a boat in various places as various situations may arise.

An object of the present invention is to provide a boat trailer adapted for attachment to the rear of a towing vehicle which includes in its construction a wheeled frame having a boat carriage mounted thereon in generally overlying relation and extending beyond the rear thereof together with means for raising and lowering the front end of the carriage for adjusting the angle of the carriage to facilitate the loading and unloading of the boat on a ground or floor surface or in shallow water or from a relatively steep bank.

Another object of the present invention is to provide a boat trailer in accordance with the preceding object in which an elongated upwardly facing channel-shaped rib member is positioned on the boat carriage for receiving the keel portion and bow portion of a boat together with rollers selectively extensible through the rib for rollably engaging the keel portion of the boat to facilitate the loading and unloading thereof.

Still other objects of the present invention reside in its simplicity of construction, ease of loading and unloading, adaptation for its particular purpose and its relatively inexpensive manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the boat trailer of the present invention illustrating the carriage tilted to the boat loading position;

Figure 2 is a top plan view of the boat trailer of the present invention with the boat removed therefrom;

Figure 3 is an end elevational view of the front end of the boat trailer;

Figure 4:
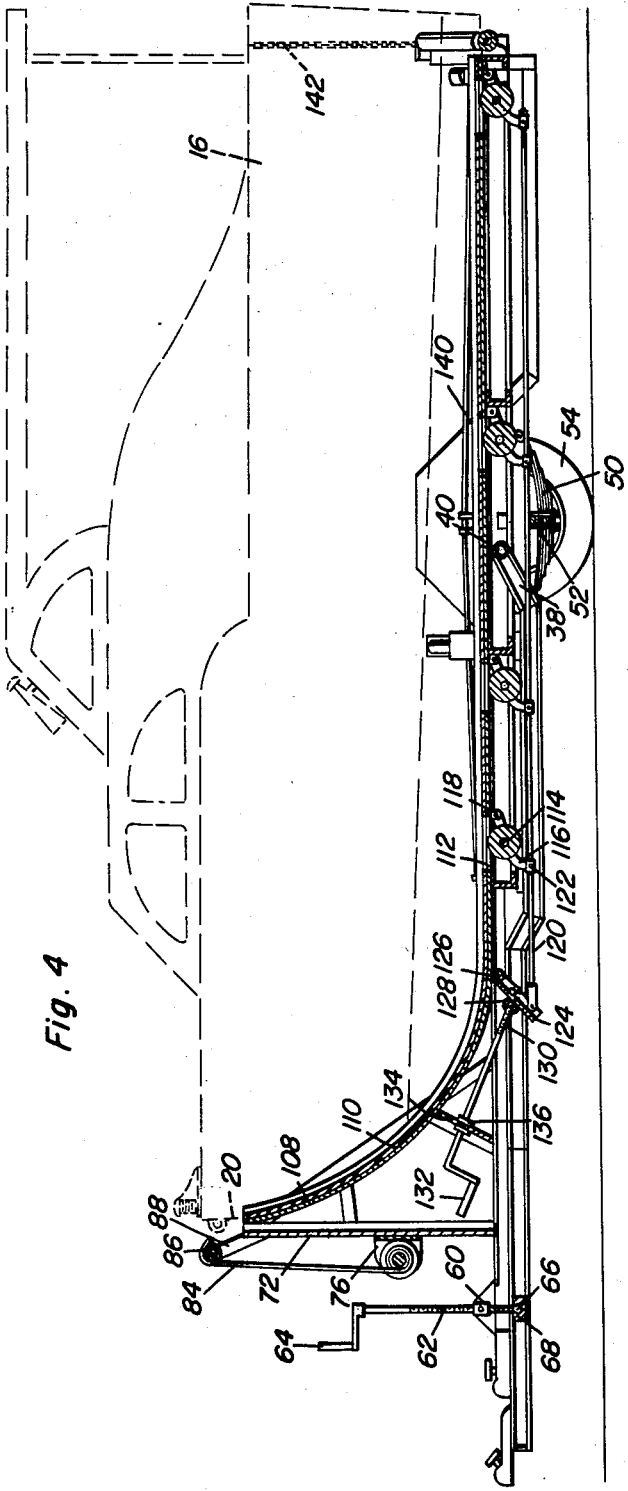
Figure 5:
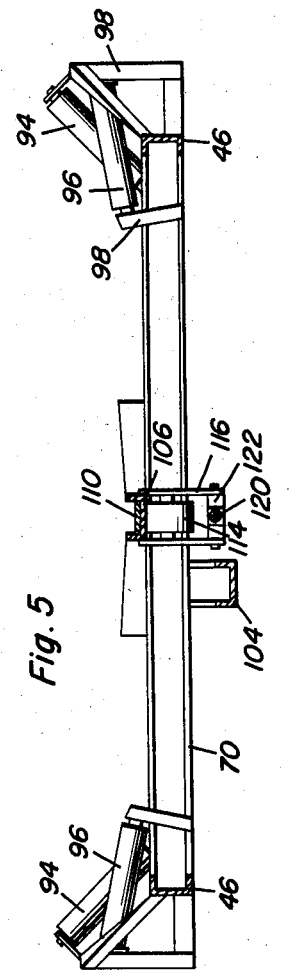

Figure 4 is a longitudinal, vertical sectional view taken substantially upon a plane passing along section line 4—4 of Figure 2 illustrating the details of construction of the boat trailer; and Figure 5 is a transverse, vertical sectional view taken substantially upon a plane passing along section line 5—5 of Figure 4 illustrating further structural details of the boat trailer and the carriage mounted on the wheeled frame.

With reference to the drawings, the numeral 10 generally designates the boat trailer of the present invention for attachment to the rear of a towing vehicle 12 having a drawbar 14 attached thereto wherein a boat 16 may be transported over land surfaces to or from a body of water. The boat 16 is provided with the usual keel portion 18, bow portion 20 and generally V-shaped bottom 22 wherein the bow portion 20 and the keel portion 18 are formed as a smooth curve. As illustrated, the boat 16 is supported on suitable chocks 24 or other supporting members wherein the boat 16 will be moved onto the boat trailer 10 for transporting to a body of water.

The boat trailer 10 generally includes a wheeled frame generally designated by the numeral 26 and a boat carriage generally designated by the numeral 28, wherein the carriage 28 is pivotally mounted on the frame 26 in overlying relation thereto and extends beyond the rear end thereof wherein the carriage 28 may be raised and lowered to a loading and unloading position with the rear end of the carriage 28 being disposed closely adjacent a ground surface or other supporting surface wherein loading and unloading of the boat 16 will be facilitated.

The wheeled frame 26 generally includes a pair of forwardly converging rails 30 having upwardly offset portions 32 adjacent the center thereof wherein the forward ends of the members 30 are interconnected and form a hitch 34 having a downwardly opening semispherical member 36 for attachment to the drawbar 14 on the vehicle 12 that is provided with a ball member. The rear ends of the members 30 extend upwardly as indicated by the numeral 38 and are attached to a transverse rod 40 which may or may not be of tubular construction.

Disposed rearwardly of the hitch portion 34 is a spherical member 42 mounted on the frame 26 for receiving the hitch portion 44 on the boat carriage 28.

The boat carriage 28 includes a pair of longitudinal rails 46 interconnected with converging rails 48 at the forward end thereof to which is attached the hitch 44 for attachment to the ball 42 on the frame 26 for securing the carriage 28 in overlying relation to the frame 26. The outer ends of the transverse rod or pipe 40 are pivotally mounted in the longitudinal rails 46. A pair of leaf spring members 50 are mounted on the longitudinal rails 46 for supporting a transverse axle 52 centrally thereon wherein the axle 52 is provided with wheels 54 on the outer ends thereof for engaging the ground surface. The wheels 54 are provided with fenders 56 to provide protection from rocks and water being thrown by the wheels 54.

Upstanding bracket plates 58 are mounted adjacent the front of the carriage 28 for pivotally supporting a transverse member 60 which is internally threaded for receiving an elongated externally threaded member 62 having a handle 64 on the upper end thereof. The lower end of the threaded member 62 is provided with a ball end 66 mounted in a bracket 68 for pivotal and rotatable movement therein wherein rotation of the handle 64 will raise and lower the forward end of the carriage 28 when the hitch 44 is disconnected. The longitudinal rails 46 and the interconnecting transverse rails 70 project beyond the pivot rod or shaft 40 wherein upward movement of the forward end of the carriage 28 will cause downward movement of the rear end thereof, whereby the boat 16 may be easily drawn onto the carriage 28.

Adjacent the front end of the carriage 28 is an upstanding member 72 having a pair of inclined braces 74. On the forward surface of the upstanding member 72 is a pair of brackets 76 rotatably journaling a winch 78 having a handle 80 thereon together with a suitable ratchet mechanism 82 and a flexible cable 84 for positioning over a pulley 86 mounted between brackets 88 on the upper end of the upstanding member 72 wherein the cable 84 may be attached to the boat 16 for pulling the same onto the carriage 28.

On the rearmost transverse member 70 on the rear edge thereof is a pair of rearwardly projecting brackets 90 having a horizontally disposed roller 92 rotatably supported therebetween. At the outer corners of the rearmost transverse member 70 are pairs of inclined rollers 94 and 96 mounted on upstanding bracket members 98 for engaging the bottom V-shaped portion 22 of the boat 16 for guiding the boat 16 onto the carriage 28. Forwardly of the axle 52 and of the pivot rod 40 is a pair of inclined rollers 100 mounted on the ends of upstanding bracket members 102 which are supported by one of the transverse rails or beams 70.

A rear longitudinal member 104 is provided between the rearmost transverse beams or rails 70 in offset relation to the center of the carriage 28 for rigidifying the carriage 28.

Disposed longitudinally in the carriage 28 is an elongated upwardly facing channel-shaped rib member 106 having an upwardly curved forward portion 108 wherein the entire length of the rib 106 and the forward portion 108 is provided with a cushion 110 in the bottom thereof. Also provided in the bottom of the rib member 106 and the cushion 110 is a plurality of openings 112 which are disposed in longitudinally spaced relation. Mounted below each of the openings 112 is a roller 114 mounted on bracket members 116 pivotally supported on lugs 118 on the undersurface of the rib member 106. Interconnecting the remote end of each of the brackets 116 is an elongated rod 120 connected thereto by a pin 122 to permit pivotal movement between the rod 120 and the brackets 116. The forward end of the elongated rod 120 is pivotally attached to a plate member 124 that has one end hingedly secured to a rod 126 on the rib member 106.

A threaded block 128 is secured to the plate 124 for threadedly receiving an elongated rod 130 having a handle portion 132 with the shank thereof extending through a plate 134 wherein the shank portion is provided with spaced flanges 136 for engaging opposite surfaces of the plate 134 wherein rotation of the handle 132 and the threaded member 130 will cause pivotal movement of the plate 124 which will cause pivotal movement of the brackets 116 for selectively moving the rollers through the openings 112 into engagement with the keel portion of the boat 16 wherein the boat 16 may be moved in relation to the carriage 28 in an easy manner.

For strengthening the carriage 28, longitudinal tie rods 140 are provided on the upper surface of the longitudinal rails 46 for strengthening the same. Also, a hold-down chain 142 may be provided on the upper ends of the outer and rearmost brackets 98 for the rollers 94 for retaining the boat in position. Also, stop lights and signal lights may be provided on the trailer in accordance with the various local regulations and as may be desired.

In operation of the boat trailer 10, the boat 16 will normally be positioned as illustrated in Figure 1 and the vehicle 12 manipulated so that the boat trailer 10 will be in position in front of the boat 16. The carriage 28 is then elevated at the forward end thereof by utilizing the adjusting screws 62 to lower the rear end of the carriage 28 to a position immediately under and forwardly of the boat 16 and the cable 84 is attached to the front end of the boat 16 for pulling the boat 16 onto the carriage 28 by use of the winch mechanism 78. The handle 132 may be actuated for projecting the rollers 114 through the opening 112 wherein the keel portion of the boat 16 will engage the rollers, thereby facilitating the movement of the boat 16 onto the carriage 28. The rollers 114 in conjunction with the rollers 94, 96 and 100 rollingly support the bottom portion of the boat 16, thereby permitting the winch 78 to move the boat onto the carriage 28. After the boat is in position with the bow portion disposed in the upturned forward end 108 of the rib member 106, the rollers 114 may be lowered, thereby permitting the entire keel portion and bow portion of the boat 16 to be disposed in the elongated upwardly facing channel-shaped rib member 106 for positioning the boat on the trailer. After this condition is arrived at, the screw jack 62 may be actuated for lowering the carriage 28 to a position overlying and adjacent to the frame 26 and suitable hold-down chains 142 may be provided for securing the boat 16 on the boat trailer 10 for movement over highways and the like to and from the body of water. If desired, the device may be utilized for lowering the boat into shallow water or even down a relatively steep bank wherein the rear end of the carriage 28 may be disposed in any suitable angular relation to facilitate the loading and unloading of the boat.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A boat trailer comprising a wheeled frame, means for attaching the frame to a towing vehicle, a boat carriage mounted on said frame in overlying relation for pivotal movement about a transverse axis, means selectively locking the carriage in generally parallel relation to the frame, means for raising and lowering the front end of said carriage, an elongated upwardly facing channel-shaped rib on said carriage, said rib having the forward end curved upwardly for receiving the bow and keel portion of a boat, means on said carriage for pulling a boat onto the rib, said rib having a plurality of longitudinally spaced openings, a pivotal bracket underlying each opening, a roller mounted on each bracket, and means interconnecting the brackets for selectively moving the rollers through the openings to engage the keel portion of a boat to facilitate relative movement between the boat and rib, said carriage having an upstanding member adjacent the front end thereof, and a winch with a flexible member attached thereto mounted on said upstanding member constituting the means for pulling a boat onto the rib, said carriage having a plurality of pairs of transversely spaced rollers disposed in inclined relation for engaging the bottom portion of a boat.

2. The combination of claim 1 wherein said carriage projects rearwardly from the frame whereby the rear of the carriage may be lowered to facilitate the loading and unloading of a boat, said means for raising and lowering the front end of the carriage including a manually actuated jack.

3. A boat trailer comprising a mobile frame, a boat carriage mounted on said frame in overlying relation, means interconnecting the carriage and the frame for permitting pivotal movement of the carriage about a transverse axis, said carriage extending beyond the rear end of the frame with the transverse axis being disposed adjacent the rear of the frame, means for raising and lowering the front end of said carriage thereby swinging the rear end of the carriage in a vertical plane from a horizontal position generally parallel to the frame to an inclined position adjacent a water surface for facilitating the loading and unloading of a boat, said carriage including an elongated longitudinal member for receiving the keel of a boat, said longitudinal member having a plurality of longitudinally spaced rollers mounted thereon for movement through the longitudinal member from a position below the longitudinal member in spaced relation to the keel of a boat to a position in contact therewith for facilitating movement of the boat in relation to the longitudinal member, and means raising and lowering said rollers simultaneously.

4. The combination of claim 3 wherein means is provided on the front end of the carriage for pulling a boat onto the longitudinal member, and inclined roller means on the carriage for engaging the boat in laterally spaced relation to the keel.

References Cited in the file of this patent
UNITED STATES PATENTS

| | | |
|---|---|---|
| 2,586,485 | Schroeder | Feb. 19, 1952 |
| 2,608,314 | Krider | Aug. 26, 1952 |
| 2,676,716 | Sallis | Apr. 27, 1954 |
| 2,708,045 | Shontz | May 10, 1955 |
| 2,711,259 | Jones | June 21, 1955 |
| 2,723,038 | Peterson et al. | Nov. 8, 1955 |
| 2,733,823 | Evans | Feb. 7, 1956 |
| 2,746,622 | Roy | May 22, 1956 |
| 2,765,941 | Mamo | Oct. 9, 1956 |